Jan. 19, 1943.     W. W. HALLINAN     2,308,655
VARIABLE SPEED PULLEY
Filed Jan. 13, 1940     4 Sheets-Sheet 1

Inventor.
William W. Hallinan
By Williams, Bradbury,
McCaleb & Hinkle
Attys Jan. 19, 1943.  W. W. HALLINAN  2,308,655
VARIABLE SPEED PULLEY
Filed Jan. 13, 1940  4 Sheets-Sheet 3

Patented Jan. 19, 1943

2,308,655

UNITED STATES PATENT OFFICE 2,308,655

VARIABLE SPEED PULLEY

William W. Hallinan, Mendota, Ill.

Application January 13, 1940, Serial No. 313,673

8 Claims. (Cl. 74—230.17)

The present invention relates to variable speed pulleys, and is particularly concerned with variable speed pulleys controlled responsive to variations in pressure or temperature, and adapted to provide a continuously and uniformly varying change of speed if used as a driven or driving member.

The present application is a continuation-in-part of my prior application, Serial No. 196,003, filed March 15, 1938, for Variable speed pulleys, Patent No. 2,210,976, issued August 13, 1940.

The variable speed pulleys constructed according to the present invention are capable of many different applications. For example, they may be used for controlling the speed of a conveyor for conveying articles to be treated with heat, through a heated or drying atmosphere, or they may be used as a drive in a refrigerator system in which the temperature controls the speed of a compressor or a circulating fan.

One of the most important applications of my variable speed pulley as it now appears to me is in the application of the pulley to the circulation of air in heating or air conditioning systems. For example, according to the methods of the prior art, air conditioning systems are provided with standard pulleys, the parts of which are manually adjustable, so as to give the driven member a predetermined speed, and the pulleys on the motor and fan are so adjusted relative to each other to bring in sufficient air to take care of the maximum heating load.

Under these conditions it is necessary to set the thermal control for the switch which controls the fan motor at about 175 degrees F., although it is sometimes set at 150 degrees F., and these relatively high temperatures are necessary to prevent the blowing of a blast of cold air by the circulating fan.

If the thermal control for the circulating fan motor is set at a lower temperature, the fan will start to operate before the bonnet of the furnace has been heated to a sufficient temperature to heat the air which is circulated by the fan.

Under these conditions of the prior art I have found that the fan motor starts and shuts off a number of times before it starts to run regularly to circulate the air. For example, the fan may start and run for a minute or so and then shut off, for the reason that as soon as the fan motor is started the cold air, which is brought in at the maximum pulley speed, cools off the bonnet and thermal control and immediately shuts the fan off again.

This is not a desirable mode of operation.

One of the objects of the present invention is the provision of an improved variable speed pulley and heating system, in which this intermittent action of the fan is eliminated, and in which it is not necessary to operate the furnace at such a high bonnet temperature. A lowering of the operating temperature is less wasteful of fuel, and more economical.

Another object of the invention is the provision of an improved variable speed pulley and heating system, in which the furnace may be operated at a lower temperature and within a smaller range of temperature variation for the purpose of maintaining a more uniform temperature in the space to be supplied with heated air, and in order to operate the system more efficiently.

According to the practices of the prior art, furnaces which are provided with ordinary constant speed driving pulleys on their motors and circulating fans require a heating to a temperature which is too high from several points of view. In such cases it is either necessary to have the fan motor turned off to stop circulation, when the furnace burner is turned off, or the temperature will over-run that required if the fan continues to operate because the fan continues to use up the heat after the burner has stopped.

According to the present invention, the operation of the air and circulating fan is not wholly dependent upon the time of operation of the oil burner, as the air circulating fan may operate, depending upon the temperature in the bonnet, or the temperature of the bonnet of the furnace, and there is no tendency to over-run the temperature desired in the rooms heated, because the speed of operation of the circulating fan is continuously varied with the bonnet temperature, and diminishes as the temperature of the furnace bonnet or the air in the bonnet decreases.

I have found that air which is warmer than the body temperature may actually feel cooler when it is subjected to circulation, on account of the tendency of the moving air to carry away the vapors which are passed off by the skin, and therefore it is not desirable to circulate air which is only slightly warmer than the body temperature at a high speed, as must be done with the systems of the prior art, where the fan speed is required to be set at a value which is sufficient to take care of the maximum heating load.

I have also found that air which is at a temperature of from 100 degrees F. to 110 degrees F. still feels warm when it is circulating at a relatively low speed, and there is no cold air blast effect in my heating system which is operated under these conditions.

Therefore, another object of the invention is the provision of an improved heating system which is adapted to circulate the air at a speed and in a volume which is dependent upon the temperature of the circulating air so that blasts of air which feel cold may be avoided under all conditions and so that the circulation of the air in the system may be accomplished for a longer period of time and more nearly continuously to avoid stratification, or what is called a "low seventy" at certain parts of the rooms which are being heated.

According to the present invention, with the improved thermally controlled variable speed pulley of my invention, the pulley may start at a slow speed, and the thermal control for the switch, which controls the fan motor, may be set relatively low, at, for example, from 100 degrees F. to 110 degrees F.

This still feels warm, as the fan is only moving a small volume of air, but as the furnace heats up and the temperature of the air in the bonnet increases, the speed of the fan may be increased by the thermally controlled pulley, so that heated air is taken away more rapidly from the furnace and the heat produced by the burner is distributed more quickly when there is more heat to be distributed.

Under these operating conditions the furnace may operate at a lower temperature and there will be less heat lost in the cellar and less heat lost up the furnace stack. For example, suppose there is an upstairs demand of from 5 to 10 degrees in the morning, as there might be, this requires a greater temperature at the bonnet of the furnace, and the bonnet temperature may go up to 150 or 165 degrees F. According to the present system, the blower speed is then automatically increased as the bonnet heats up.

Another object of the present invention is the provision of an improved variable speed pulley and heating system in which the speed of operation of the circulating fan is increased automatically to compensate for any increased filter resistance. The accomplishment of this result may be analyzed as follows:

The heat input of the furnace may be assumed to be constant, and the transfer effectiveness of the furnace constant. Increased filter resistance, which is caused by filling up of the filter with dust or other foreign material, permits less air to pass through the filter and less heat is carried away from the bonnet. The furnace bonnet becomes hotter, and therefore the thermostat, which controls the pulley according to the present invention, increases the effective diameter of the pulley, increases the speed of operation of the fan, and thus automatically offsets the increased filter resistance by a higher fan speed.

Another object of the invention is the provision of an improved heating system in which the circulating fan may continue to circulate air at a low temperature continuously or almost continuously, so as to avoid stratification.

Another object of the invention is the provision of an improved thermally controlled variable speed fuel and heating system which is adaptable to heat anticipation controls. For example, I have found that the heat anticipation controls of the prior art will turn the burner on several times and then turn it off without the fan operating. This is not efficient because the heat which is produced during this intermittent operation of the burner, without fan operation, is not conveyed to the rooms to be heated.

One partial solution of such a difficulty would be the provision of a two-speed motor system, but such two-speed motor systems would be expensive and at best provide only a partial solution of the difficulty.

Therefore, another object of the invention is the provision of an improved thermally controlled variable speed pulley for heated air circulating systems, which provides a substantially continuous modulation of the fan speed, depending upon the temperature of the air to be circulated.

The volume of the blower increases with the square of the speed, and it is found that changes in volume may be made practically proportional to changes in temperature so that the relation between volume and temperature may be represented, for all practical purposes, as a straight line curve.

Another object of the invention is the provision of an improved thermally controlled variable speed pulley which is adaptable to the use of standard commercial wafers and bellows, and which is provided with a long bearing adapted to prevent tilting of the half pulley section which might cause the development of a rattle.

Another object of the invention is the provision of a thermostatically controlled variable speed pulley in which the thermostat rotates axially with the pulley, in order to eliminate pressure connections between rotating and non-rotating parts, and in which thrust bearings may be eliminated.

Another object of the invention is the provision of an improved thermostatically controlled pulley structure in which the thermostatic wafers are maintained in centered relation so that the complete pulley structure is balanced, and in which abrasion and oxidation are prevented by non-metallic spacers between the wafers.

Other objects and advantages of the invention will be apparent from the following description and the accompanying drawings, in which similar references indicate similar parts throughout the several views.

Referring to the four sheets of drawings.

Figure 1:
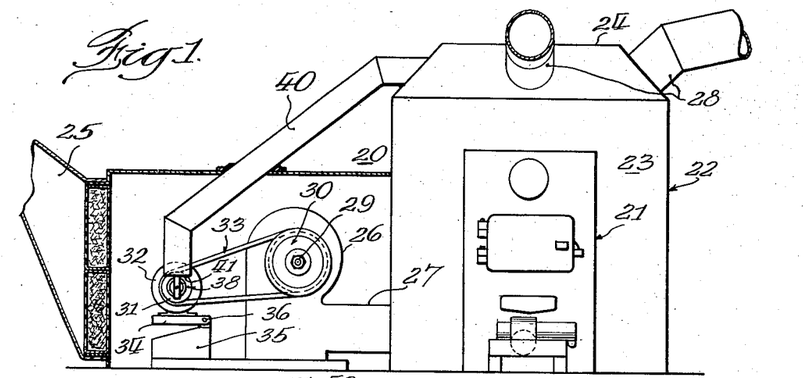
Fig. 1 is a diagrammatic illustration of a heating system embodying a variable speed pulley constructed according to the present invention.

Referring to Fig. 1, 20 indicates diagrammatically a heating system comprising a hot air furnace 21, provided with an outer housing 22, forming a plenum chamber 23, and provided with a bonnet 24.

The plenum chamber is connected with the rooms to be heated by the usual cold air ducts 25, which lead to the ventilation fan 26, preferably of the centrifugal type, and the outlet of the fan 26 is connected by a cold air duct 27 to the plenum chamber 23.

Heated air is taken off from the bonnet 24 through a plurality of hot air ducts 28 leading to the rooms.

The centrifugal fan 26 includes the usual centrifugal impeller, mounted upon a shaft 29, the shaft being provided with a sectional V pulley 30, the sections of which may be spring pressed together to compensate for changes in effective belt length, as the variable pulley 31 on the motor 32 changes its effective diameter.

In other embodiments of the invention an ordinary fixed diameter V pulley may be used at 30, and the changes in effective length of the V belt 33 may be taken up by idlers or by a belt tensioning arrangement, such as the motor mounting, including the base 34 and support 35.

In the embodiment illustrated, the base 34 of the motor is pivotally mounted at 36 on the support 35 so that the weight of the motor tends to maintain the belt 33 under suitable tension.

The motor shaft 37 is provided with a thermostatically controlled variable diameter pulley, indicated in its entirety by the numeral 38.

The thermostatic element 39 is subjected to heated air from the bonnet 24 by means of a conduit 40, which extends from the bonnet 24, downward to the thermostat 39, and discharges against the thermostat 39 at the discharge opening 41.

Other modes of making the thermostat responsive to the bonnet temperature comprise the use of thermostatic devices secured to the metal of the bonnet or placed inside of the bonnet, but the present system is preferred because the motor may be substantially isolated from the hottest parts of the furnace and kept in a cooler condition.

Figure 2:
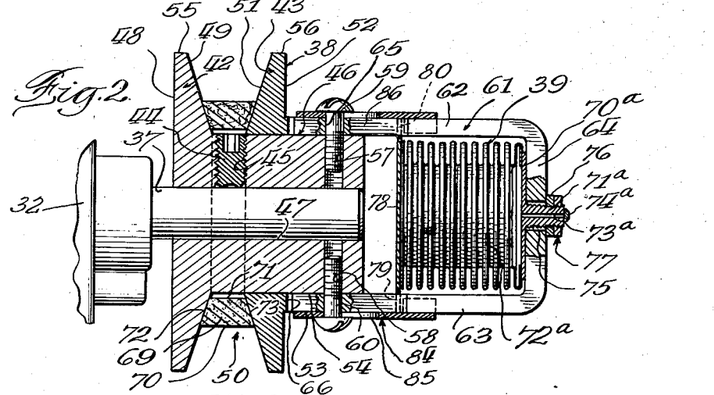
Fig. 2 is an axial sectional view taken on the plane which passes through the axis of the pulley shaft, with the thermostat in elevation.

The variable speed pulley 38 comprises a pair of movable pulley sections 42 and 43, one of which, 42, is fixedly secured to the motor shaft 37 by a key or a set screw 44 mounted in a threaded bore 45.

The motor is preferably a substantially constant speed motor which would drive the fan 26 at a substantially constant speed, irrespective of the load on the fan, within certain predetermined limits.

The pulley section 42 may comprise a metal member made of suitable material, such as steel, or it may, in some embodiments, be made of fibrous material, such as molded phenolic condensation products.

The pulley section 42 is preferably provided with a centrally located cylindrical hub 46, having an axially extending cylindrical bore 47 for receiving the motor shaft 37.

At the left end of Fig. 2, the pulley section may have a flat face 48, but on its right side and outside of the hub 46 it is provided with a frusto-conical surface 49, forming one side of a substantially V shaped groove 50.

The pulley section 43 may comprise a member of similar material, having a frusto-conical surface 51, sloping away from the frusto-conical surface 49, so as to form the V shaped groove 50, and having a flat annular surface 52 surrounding the cylindrical hub 53.

The cylindrical hub 53 may be provided with a cylindrical bore 54 for slidably receiving and engaging the outer cylindrical surface of the hub 46 on the other pulley section.

The frusto-conical surface 49 and flat surface 48 of the section 42 may terminate in an annular ridge or at a cylindrical surface 55, at the periphery of the pulley section 42. In a similar manner there may be a cylindrical surface 56 at the periphery of the pulley section 43.

The hub 46 of the pulley section 42 may be provided with a pair of oppositely located and diametrically extending threaded bores 57, 58 for receiving the screw bolts 59, 60. These screw bolts may be utilized for supporting a yoke 61, which may be of substantially U shape, having a pair of legs 62, 63, joined by an end portion 64. The yoke or thermostat-supporting member 61 has a bore 65 in each of its legs 62, 63 for receiving the screw bolts 59 and 60, whereby the yoke 61 is fixedly secured to the left pulley section 42.

The hub 53 of the right pulley section is preferably provided with the axially extending slots 66 for slidably receiving the legs 62, 63 of the yoke 61. The walls 67 and 68 of slot 66 have a suitable tolerance with respect to the legs 62, 63 of the yoke 61, to permit a sliding movement, and the pulley section 43 is thus slidably mounted on the hub of the pulley section 42, but any substantial amount of rotation is prevented between these pulley sections.

It will be noted that the hub 46 of the pulley section 42 is relatively long, providing an elongated cylindrical bearing surface 46 for the outer hub 53, so that there is very little possibility of any tilting of the pulley section 43 on the pulley section 42, due to the action of V belt 69, which usually engages over slightly more or slightly less than half of the pulley at one time.

The belt 69, which has been termed a V belt, is preferably substantially trapezoidal in section, being provided with the outer cylindrical surface 70, inner cylindrical surface 71, and lateral cylindrical surfaces 72 and 73.

The axial dimension between the frusto-conical surfaces 72 and 73 is preferably relatively large so that these frusto-conical surfaces of the belt may engage the surfaces 49 and 51 on the pulley sections over a wider range of movement of the pulley.

The taper of the belt-engaging parts 49 and 51 of the pulley sections makes the engaging surfaces farther apart at larger effective diameters, and the provision of a belt of suitable dimensions in an axial direction permits the engagement of the belt with the frusto-conical surfaces on the pulley sections at greater effective diameters.

As such belts are customarily called V belts in the trade, I employ the term V belt throughout this specification and claims to include not only a belt of actual V cross-section, but a belt of the type illustrated, in which the inner ridge of the V has been eliminated, so that the belt is actually frusto-conical in cross-section.

The thermostatic controlling device 39 may consist of a metallic expansible bellows, having one end closed by a metallic supporting plate 70a, having a threaded supporting stud 71a. The plate 70a has a fluid-tight soldered or welded connection, with the end of the bellows 72a, and the stud 71a may have an axial filling aperture 73a, which may be closed after filling the bellows with a suitable expansible fluid by means of a drop of solder 74a. In case it is desired to use the variable diameter pulley as a pressure responsive device, the conduit 77 may be connected by a suitable rotating fluid-tight connection to a pipe leading to a source of pressure to which the pulley is to be responsive, or leading to a thermostatic bulb arranged in proximity to the bonnet, or located inside the bonnet, or attached to the metal thereof.

Threaded stud 71a extends through a centrally located aperture 75 in the yoke 61, and the bellows is fixedly secured to the yoke 61 by a clamping nut 76 and a lock nut 77a. Thus the right end of the bellows is fixedly secured to the pulley section 42 through the intermediary of the yoke 61 and the hub 46 and screw bolts 59.

The opposite end of the bellows 72a is closed by means of a metal plate 78, which is likewise provided with a fluid-tight connection to the endmost fold of the bellows 72a, and the plate 78 is provided with a pair of slots 79 and 80 for embracing the legs 62, 63 of the yoke 61.

Figure 3:
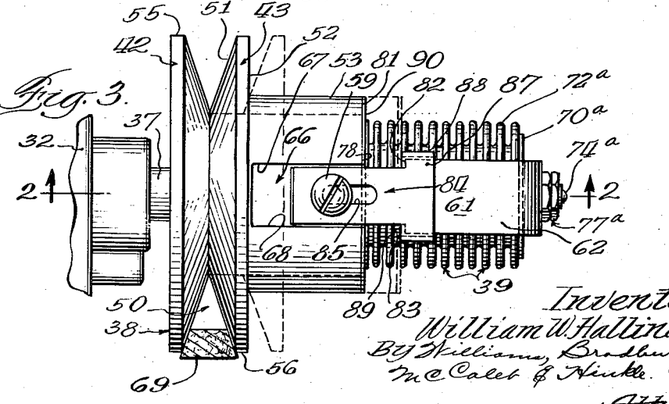
Fig. 3 is a plan view taken from the top of Fig. 2.

The plate is adapted to engage the annular end surface 81 of the hub 53 of pulley section 43 so that expansion of the bellows 72a tends to force the pulley section 43 from the position of Fig. 2 toward that of Fig. 3.

Thus a heating up of the expansible fluid inside the bellows 72a tends to force the pulley sections together and to increase the effective diameter of the pulley 31.

The yoke 61 may be provided with suitable permanent stops for limiting the spreading of the pulley sections 42, 43 by having the ends of the legs 62, 63 of reduced width to provide stop shoulders 82, 83. The device may also be provided with suitable adjustable stop means, comprising a pair of sheet metal stop members 84, each of which are identical in shape and which are slidably mounted on the screw bolts 59 and 60 by means of slots 85.

Each of these stop members 84 comprises a substantially rectangular strip of metal of the same width as the reduced width portions 86 of the legs 62 and 63. The stop members 84 may have laterally extending portions 87 at each side, provided with depending guide flanges 88 at each side.

The guide flanges 88 engage the sides of the legs 62, 63 and prevent rotation of the stop member 84 on screw bolt 59. The left edges 89 (Fig. 3) of the extensions 87 of the stop members 84 serve as stop surfaces for engaging the annular surface 90 at the right side of the plate 78 in Fig. 3. Thus the range of spread of the pulley sections 42 and 43 may be adjusted, and the device may be used with smaller belts, that is, belts of less width in axial direction than that shown.

Figures 4, 5, 6:
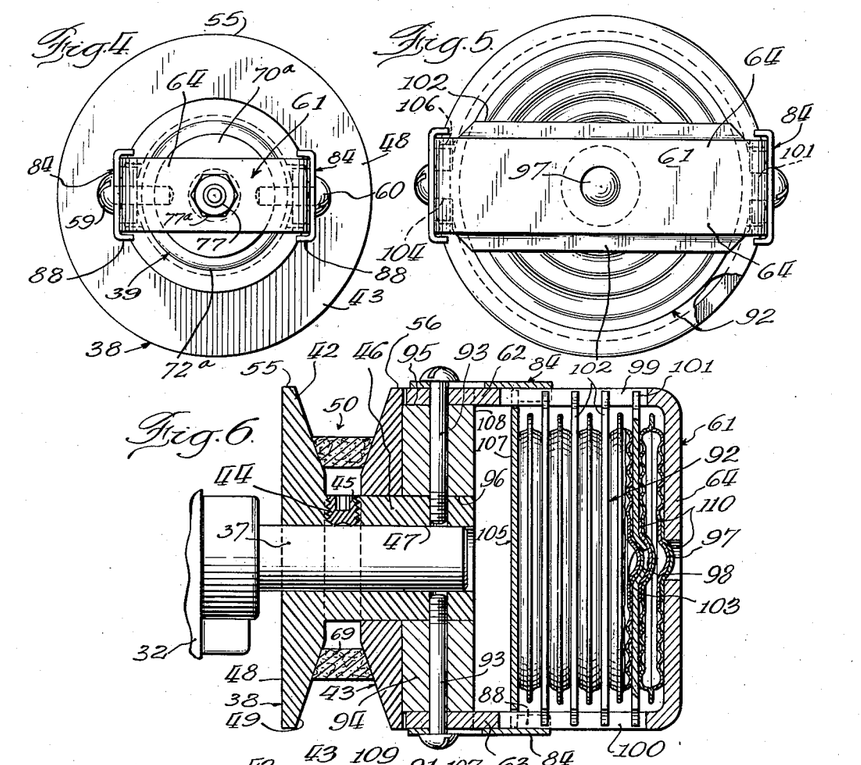
Fig. 4 is an end elevational view taken from the right end of Fig. 3.
Fig. 5 is an end elevational view of a modification in which thermostatic wafers are employed.
Fig. 6 is an axial sectional view taken on the plane of the line 6—6 of Fig. 7, looking in the direction of the arrows, showing the same modification.
Figure 7:
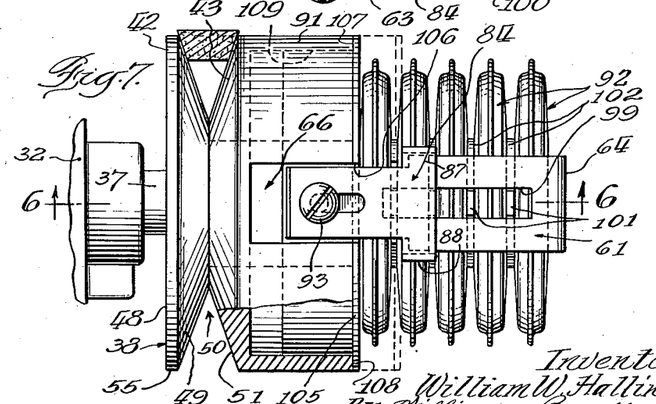
Fig. 7 is a top plan view of the same modification, taken from the top of Fig. 6.

Referring to Figs. 5, 6, and 7, these are modifications in which certain adaptations and changes of structure may have been made for the purpose of accommodating the wafer type of thermostat.

In this embodiment the left hand pulley section 42 is substantially the same, but the right hand pulley section 43 has its hub 91 of the same size as the largest diameter of the pulley section. The hub 91 is formed by an axially projecting annular flange, which is likewise provided with slots 66.

The yoke 61 has its end portion 64 of longer dimensions so as to span the relatively wide thermal wafers 92 and permit them to be arranged between the legs of the yoke. The ends of the legs 62 and 63 are likewise secured to the hub 46 of the pulley section 42 by the longer screw bolts 93, which also pass through an annular member 94.

The annular member 94 may have flat end surfaces and an outer cylindrical surface 95, and an inner bore 96 fitting on the hub 46.

The wafers 92 may be of any conventional or commercial construction, but are preferably formed with the centrally located partially spherical projection 97 at the center of one side, and with a similarly shaped depression 98 at the center of the other side. In order to retain the wafers 92 within the yoke 61, the legs 62 and 63 are preferably provided with longitudinally extending slots 99, 100 for receiving the end portions 101 of a plurality of spacing and retaining plates 102. Each of these spacing plates may consist of a substantially rectangular metal plate 102, formed with a pressed depression 103 at the center, which provides a protuberance on the other side complementary to the depression in one side of the wafer.

In other words, the formation 103 at the center of each spacing and retaining plate 102 is complementary to the formations 97 and 98 at the center of the wafers. Each spacing plate has an outwardly projecting flange 104 at the opposite sides of the plate, the flanges 104 being adapted to be slidably received in the slots 99 and 100.

Thus the plates 102 are slidably mounted for axial movement inside the yoke 61, and by virtue of the central depressions and protuberances on the plates and wafers, the wafers are retained between the plates.

The wafers 92 are, of course, flexible metallic housings, the flexible walls of which are preferably corrugated, and the wafers are filled with a thermally expansible fluid, having a high coefficient of thermal expansion.

The endmost plate 105 at the left of the wafer assembly in Fig. 6 may be a circular plate of larger size than the wafers, and has a pair of oppositely located slots 106 engaging on the opposite sides of the yoke legs 62, 63.

The opposite face 107 of the plate 105 engages the edge 108 of the annular hub 91 on the pulley section 43 and tends to urge the pulley sections together when the wafers expand, as shown in Fig. 7. The pulley section 43 has a relatively long sliding bearing engagement between the inner cylindrical surface 109 and the outer cylindrical surface 95, and there is no tendency toward tilting of the pulley section 43 relative to the pulley section 42.

The operation of the embodiments shown in Figs. 2 to 7 is substantially the same. When the bellows or wafers are subjected to normal room temperatures or predetermined bonnet temperatures, the bellows are in the contracted condition, as shown in Fig. 2, and the wafers are in the contracted condition, as shown in Fig. 6.

The effective diameter of the variable speed pulley 31 is then at a minimum, and the sections 42, 43 of the pulley are automatically forced apart by the action of the wedge-shaped belt 33, which is subjected to tension by a suitable tensioning device or by a tensioning weight of the motor mounting.

Upon heating up of the bellows 39 or wafers 92, these elements expand and tend to force the pulley sections 42, 43 closer together from the position of Fig. 2 or Fig. 6 toward that of Fig. 3 or Fig. 7.

The effective pulley diameter is directly dependent upon the temperature to which the thermostats are subjected, and the taper of the belt-engaging surfaces on the pulley and the characteristics of the thermostats may be made such that the variation in speed is substantially proportional to the variation in temperature, by which I mean that the temperature speed relation may be expressed substantially as a straight line curve over a predetermined range of operation.

Upon a cooling down of the thermostat, the action of the belt and the belt-tensioning arrangement tends to force the pulley sections apart to follow up the contraction of the bellows or wafers, and the effective diameter of the V pulley is at all times dependent upon the temperature to which the thermostatic elements are subjected.

Each wafer has the center of its face preferably provided with an insulating layer of non-metallic material, adapted to prevent the metallic contact between the wafers 96 and the spacers 102. This layer may consist of a strip of zinc oxide tape 110 adhered to each side of the wafer at the center depression and protuberance. I have found that this tape prevents oxidation and wear of the wafers and keeps them in operating condition for long periods of time.

The present device may be provided with the same fixed and adjustable stop members, and in order to prevent interference between the stop member 84 and the spacer plates 102, the spacer plates have been provided with the end flanges 101 mounted in slots 99.

Figure 8:
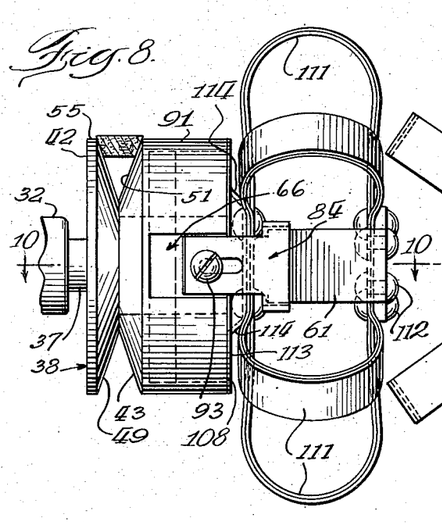
Fig. 8 is an elevational view of another modification, in which the movement between the pulley sections is controlled by bi-metallic thermostats.
Figure 9:
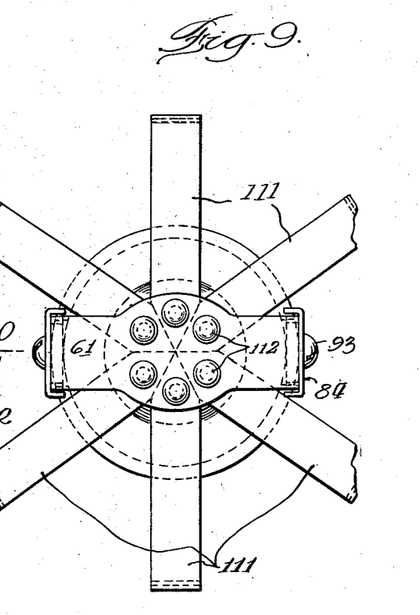
Fig. 9 is an end elevational view of a modification of Fig. 8.
Figure 10:
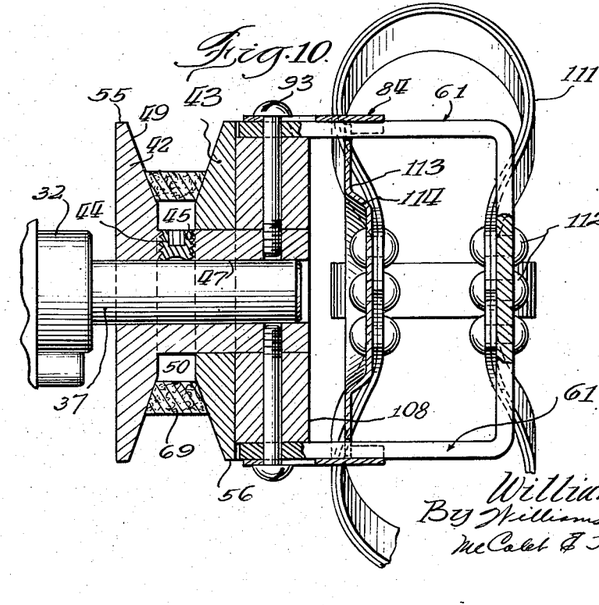
Fig. 10 is a sectional view taken on the plane of the line 10—10 of Fig. 8, looking in the direction of the arrows.

Referring to Figs. 8 to 10, these are views of another modification, in which the pulley sections may be of similar structure to that described with respect to Figs. 5 to 7.

In this embodiment, however, the movable pulley section 43 is adapted to be actuated by a plurality of bi-metallic thermostatic elements 111. The bi-metallic elements 111 may be of any conventional commercial construction, consisting preferably of two closely joined strips of metal of different coefficients of thermal expansion. The metal of the larger coefficient of thermal expansion is arranged on the inside so that the U-shaped bi-metallic thermostats 111 tend to expand from the position of Fig. 10 to that of Fig. 8.

In this embodiment the supporting yoke 61 may have one end of each of the bi-metallic thermostatic elements 111 secured to it at the center by means of a plurality of rivets 112, and the opposite ends of the bi-metallic elements may bear loosely against or be secured to a pressure plate 113, which has its face surface 114 engaging the annular end surface 108 of the hub 91.

The pressure plate 113 is dished at 114 to provide space for the rivets 115, where rivets are used.

The thermostatic elements 111 are preferably symmetrically arranged with respect to the axis of the pulley and equally spaced from each other angularly.

Referring to Figures 11 to 15, these views show a modification including a specific structure which is provided with an improved mode of lubrication and an improved form of mounting the thermally responsive means on the pulley. In this embodiment the variable speed pulley, indicated in its entirety by the numeral 120, again includes the pair of movable pulley sections 42 and 43 and the pulley section 42 is again provided with the centrally located cylindrical hub 46 having the axially extending bore 47 for receiving the motor shaft 37. In this case, however, an arrangement is illustrated for adapting the bore to shafts of different diameter, this arrangement including a metal sleeve 121 having an aperture 122 for the set screw 45 and the sleeve 121 fits in the bore 47 and fits on the shaft 37.

Figures 11, 12, 13, 14, 15:
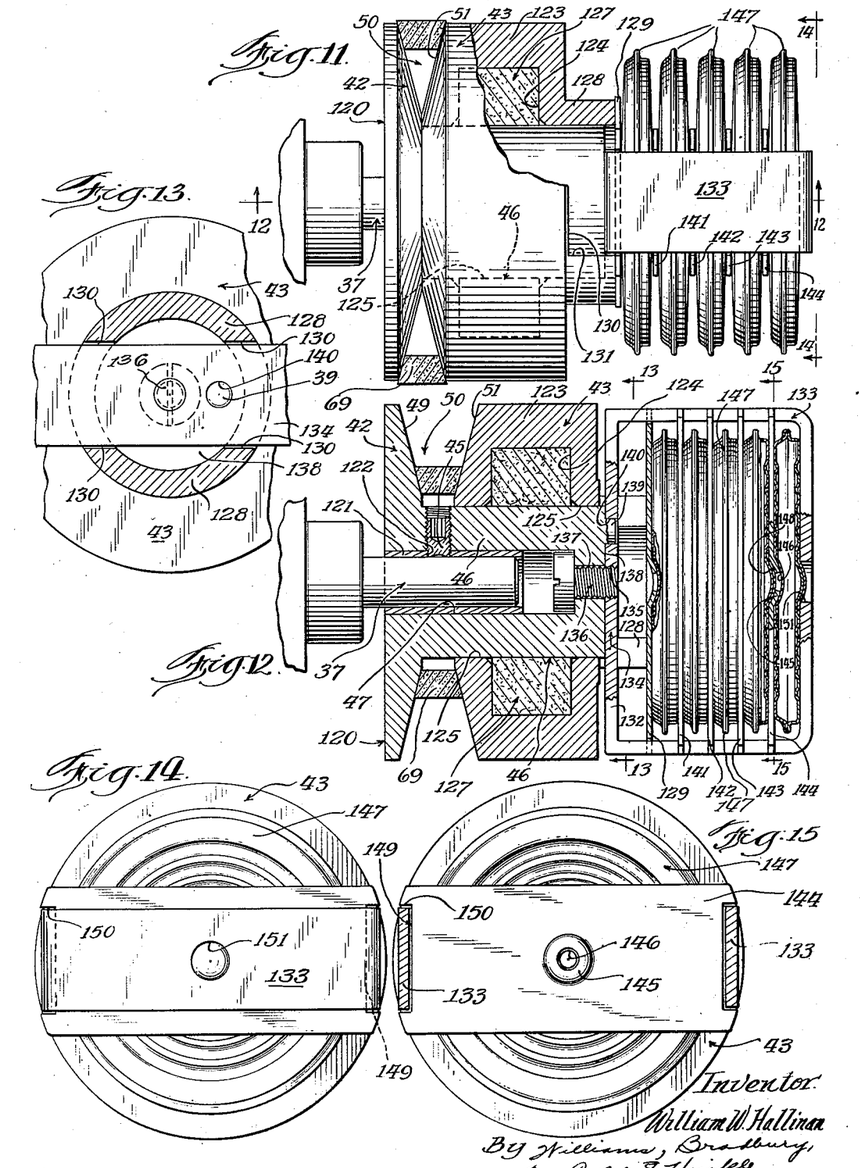
Fig. 11 is an elevational view of a modified form of a variable speed pulley in partial section showing the details of construction.
Fig. 12 is a sectional view taken on the plane of the line 12—12 of Fig. 11, looking in the direction of the arrows.
Fig. 13 is a fragmentary sectional view taken on the plane of the line 13—13 of Fig. 12, looking in the direction of the arrows.
Fig. 14 is an end elevational view taken from the right end of Fig. 11.
Fig. 15 is a sectional view taken on the plane of the line 15—15 of Fig. 12.

This type of pulley is again provided with the frusto-conical surface 49 forming one side of the substantially V-shaped belt groove 50.

The pulley section 43 may comprise a substantially cylindrical metal body 123 which has a frusto-conical surface 51 at one end sloping away from the frusto-conical surface 49 so as to form the V-shaped groove 50. The cylindrical body of the pulley section 43 is long enough to provide space for an annular reservoir 124 located in the body surrounding the cylindrical bore 125. The cylindrical bore 125 has a sliding fit on the elongated cylindrical hub 46 and the reservoir 124 may be filled with an absorptive material, such as the felt or lamb's wool filling 127 adapted to hold a suitable amount of relatively viscous lubricant, which is supplied as needed to the external cylindrical surface of the hub 46.

The pulley section 43 is provided with an axially extending thrust flange 128 surrounding the hub 46 and adapted to engage a plate 129. The flange 128 is in the form of a sleeve having an axially extending rectangular slot 130 at each side, the slots being diametrically opposite to each other and the side walls 131 of the slot serving to limit the rotative movement of the pulley section 43 on the hub 46 by the engagement of the shoulders 131 with the radial extending arms 132 of a yoke 133.

The yoke 133 may comprise a substantially rectangular metal frame formed of a strap of metal, the ends of which have been secured together to form the closed frame 133. The strap of which the frame 133 is made is of uniform cross section, having a width which permits a slight clearance with respect to the walls 131 of the slots 130. The left end 134 of the yoke 133 is provided with a centrally located threaded bore 135 adapted to be engaged by a threaded screw bolt 136.

Hub 46 has its right end provided with a smaller bore 137 for passing the screw bolt 136, the head of which is received in the bore 47. Hub 46 also has on its flat end surface 138 an axially extending cylindrical lug 139 fitting in an aperture 140 in the frame 133.

Thus the frame 133 may be fixedly secured to the end of the hub 46 by means of a screw bolt 136 which is driven home into the bore 137 and the interengagement of the lug 139 and the bore 140 prevents any relative rotation between the hub 46 and yoke 133. The yoke 133 slidably supports a plurality of metal plates 141—144 which may be identical in construction, each plate being provided with a centrally located pressed ball shaped protuberance 145. These pressed formations all extend in the same direction and are substantially complementary to the ball shaped depression 146 in one side of each thermostatic wafer 147, and also complementary to the projecting ball shaped formation 148 on the other side of each thermostatic wafer. Each of the plates 141—144 as well as the plate 129 has a rectangular slot 149 in each end.

The walls 150 of these slots slidably engage the edges of the yoke 133 and each wafer is disposed between two of the plates 129, 141—144. The end wafer at the right has its spherical projection disposed in an aperture 151 located in the end wall of the yoke 133. Strips of adhesive tape may be interposed between the metallic surfaces of each thermostatic wafer and the adjacent plates or frame which they engage.

In this embodiment it will be evident that the wedge-shaped belt 69 will tend to force the pulley sections 42 and 43 apart, the end of the sleeve 128 on pulley section 43 engaging the plate 129 and reacting against the stack of thermostatic wafers. The thermostatic wafers are maintained in alignment by means of the plates 129, 141—144, and the yoke 133, and these wafers are carried by the hub 46 through the yoke 133. When the thermostatic wafers expand, they react against the end of sleeve 128 on pulley section 43 and tend to drive the pulley sections together.

Thus an increase in the temperature of the thermostatic wafers drives the pulley sections together and increases the effective diameter of the pulley. A decrease in the temperature of the thermostatic wafers permits the wedge-shaped belt to drive the pulley sections apart and reduce the effective diameter of the pulley.

The operation of the present variable speed pulleys in a heating system of the type shown in Fig. 1 is as follows: When such pulleys are employed, the critical operating bonnet temperature for the thermostatic device controlling the fan motor 32 may be set at a lower temperature, such as, for example, 100 to 110 degrees. When the bonnet reaches this temperature, the fan is turned on; but due to the fact that the parts of the pulley are in the position of Fig. 2, Fig. 6, or Fig. 10, the effective diameter of the driving pulley is at a minimum, and the fan thus operated at a low speed, such as, for example, 275 R. P. M.

When the variable diameter pulley has its thermostatic element at or more than maximum temperature so that parts of the pulley are in the position shown in Fig. 3, the speed of rotation of the fan may be 500 R. P. M., for example. I desire it to be understood, however, that the speeds which are given for examples are not in any sense limits for practical use, as the fan's speed may be made any desired value, and the examples given are merely to show the range which has been found effective in exemplary installations.

Although the air in the bonnet is not at a high temperature, it still feels warm as it emerges from the registers when the fan is moving only a small volume of air and at a low speed. Furthermore, the amount of air moved through the plenum chamber of the furnace is not such that it cools the furnace down too quickly, and the fan will continue to operate, instead of being turned off, as I have found to be the case with the devices of the prior art.

In the arrangements of the prior art I have frequently noted that the fan operating at a maximum speed passes so much cold air through the plenum chamber that the temperature is so reduced that the fan is turned off again. This intermittent action is eliminated by my invention.

As the temperature of the air in the plenum chamber, and of course that discharged on the thermostat 39, by the duct 40, increases in temperature, the speed of the fan is automatically increased by the expansion of the thermostat and the increase in the effective diameter of the driving pulley.

The present heating system permits a continuous and gradual modulation of the fan speed so that the furnace may be operated at a lower temperature and fuel may be saved. The fan may be operated over a longer range of time, or it may be continuously operated at a lower rate of speed so as to avoid stratification and so as to constantly deliver heat from the furnace to the rooms by the moving air.

The speed varying effect of my thermostatically controlled pulley may be accentuated by the use of a belt of constant length and by having the driving and driven shafts at constant spacing, but by using a sectional spring-actuated pulley on the driven member, for taking up the effective length of the belt, which is increased or decreased, by the action of the thermostatic pulley. Thus, one pulley would increase in size, while the other decreased, and vice versa, accentuating the speed-changing effect of the thermostatically controlled pulley.

My thermostatically controlled pulley is adapted to be used either as the driving or the driven member, and its thermostatic element may be so arranged that it increases the diameter or decreases the diameter upon increase in temperature.

In addition to its use in a heating system as described, it may be used for controlling the speed of a conveyor for conveying articles through a heated atmosphere. Under such conditions, if the conveyor includes a large number of painted articles, the temperature of the heated atmosphere would naturally drop, due to the absorption of the heat by the articles, and to the increased evaporation of the solvents of the paint.

Under these conditions, and with a decreased temperature, the conveyor should move slower because the paint would require a longer time to dry at a lower temperature, and therefore the conveyor should keep the painted articles on the conveyor a longer period of time.

The same would be true in the case of a baking oven, where my variable speed pulley may be used for automatically compensating the conveyor drive for any drops of temperature. The variable speed pulley may also be used in driving the fuel feed of a stoker, and it is of general application wherever the speed of drive may be advantageously varied responsive to temperature or pressure.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a variable diameter pulley, the combination of a pulley section adapted to be secured to a shaft or the like, with a second pulley section slidably mounted on the first pulley section in an axial direction, said pulley sections being provided with opposed frusto-conical surfaces adapted to form a pulley groove of wedge-shaped cross section, a supporting frame carried by one of said pulley sections, and having a part oppositely disposed to the other of said pulley sections, and a plurality of thermostatic wafers interposed between said opposing portion and the other of said sections, whereby expansion of the wafers is adapted to move one of said pulley sections relative to the other to vary the effective diameter of the pulley groove with respect to a wedge-shaped belt of constant width, and a plurality of slidable spacers carried by said frame and interposed between said wafers, said wafers and spacers having interlocking depressions and protuberances whereby the spacers retain the wafers within said frame.

2. In a variable diameter pulley, the combination of a pulley section adapted to be secured to a shaft or the like, with a second pulley section slidably mounted on the first pulley section in an axial direction, said pulley sections being provided with opposed frusto-conical surfaces adapted to form a pulley groove of wedge-shaped cross section, a supporting frame carried by one of said pulley sections, and having a part oppositely disposed to the other of said pulley sections, and a plurality of thermostatic wafers interposed between said opposing portion and the other of said sections, whereby expansion of the wafers is adapted to move one of said pulley sections relative to the other to vary the effective diameter of the pulley groove with respect to a wedge-shaped belt of constant width, and non-metallic insulating means interposed between said wafers for preventing abrasion and oxidation of the engaging parts of said wafers.

3. A variable speed pulley comprising a hub and two relatively adjustable members carried by said hub and forming the opposite side walls of an inwardly converging belt guide groove for receiving a wedge-shaped belt by contact with said walls, one of said members being fixedly secured to the hub and the other of said members being slidably mounted on said hub, a substantially rectangular frame carried directly by said hub, the other of said members having an axially projecting portion provided with grooves for receiving the inwardly and radially extending portions of said frame connected to said hub, thermally responsive means mounted in said frame and adapted to act on a pressure plate, said pressure plate engaging the axially extending portion of said other member, whereby the members are adapted to be urged toward each other to reduce the size of the groove and increase the effective periphery of the pulley upon an increase of temperature.

4. A variable speed pulley comprising a hub and two relatively adjustable members carried by said hub and forming the opposite side walls of an inwardly converging belt guide groove for receiving a wedge-shaped belt by contact with said walls, one of said members being fixedly secured to the hub and the other of said members being slidably mounted on said hub, a substantially rectangular frame carried directly by said hub, the other of said members having an axially projecting portion provided with grooves for receiving the inwardly and radially extending portions of said frame connected to said hub, thermally responsive means mounted in said frame and adapted to act on a pressure plate, said pressure plate engaging the axially extending portion of said other member, whereby the members are adapted to be urged toward each other to reduce the size of the groove and increase the effective periphery of the pulley upon an increase of temperature, said thermally responsive means comprising a plurality of thermal wafers and said frame being provided with means for retaining said thermal wafers in said frame.

5. A variable speed pulley comprising a hub and two relatively adjustable members carried by said hub and forming the opposite side walls of an inwardly converging belt guide groove for receiving a wedge-shaped belt by contact with said walls, one of said members being fixedly secured to the hub and the other of said members being slidably mounted on said hub, a substantially rectangular frame carried directly by said hub, the other of said members having an axially projecting portion provided with grooves for receiving the inwardly and radially extending portions of said frame connected to said hub, thermally responsive means mounted in said frame and adapted to act on a pressure plate, said pressure plate engaging the axially extending portion of said other member, whereby the members are adapted to be urged toward each other to reduce the size of the groove and increase the effective periphery of the pulley upon an increase of temperature, and adjustable stop means carried by the opposite sides of said rectangular frame and adapted to engage said pressure plate to limit the spreading movement of said members by engagement of said pressure plate with said stop means.

6. A variable speed pulley comprising a hub and two relatively adjustable members carried by said hub and forming the opposite side walls of an inwardly converging belt guide groove for receiving a wedge-shaped belt by contact with said walls, one of said members being fixedly secured to the hub and the other of said members being slidably mounted on said hub, a substantially rectangular frame carried directly by said hub, the other of said members having an axially projecting portion provided with grooves for receiving the inwardly and radially extending portions of said frame connected to said hub, thermally responsive means mounted in said frame and adapted to act on a pressure plate, said pressure plate engaging the axially extending portion of said other member, whereby the members are adapted to be urged toward each other to reduce the size of the groove and increase the effective periphery of the pulley upon an increase of temperature, said axially extending portion of said other member being provided with an annular groove and two annular flanges engaging said hub forming a reservoir, and lubricant absorbing means filling said reservoir and maintaining the lubrication of said hub.

7. A variable speed pulley comprising a hub and two relatively adjustable members carried by said hub and forming the opposite side walls of an inwardly converging belt guide groove for receiving a wedge-shaped belt by contact with said walls, one of said members being fixedly secured to the hub and the other of said members being slidably mounted on said hub, a substantially rectangular frame carried directly by said hub, the other of said members having an axially projecting portion provided with grooves for receiving the inwardly and radially extending portions of said frame connected to said hub, thermally responsive means mounted in said frame and adapted to act on a pressure plate, said pressure plate engaging the axially extending portion of said other member, whereby the members are adapted to be urged toward each other to reduce the size of the groove and increase the effective periphery of the pulley upon an increase of temperature, said hub being provided at its end with a centrally located bore and threaded means in said bore for securing said frame to said hub.

8. A variable speed pulley comprising a hub and two relatively adjustable members carried by said hub and forming the opposite side walls of an inwardly converging belt guide groove for receiving a wedge-shaped belt by contact with said walls, one of said members being fixedly secured to the hub and the other of said members being slidably mounted on said hub, a substantially rectangular frame carried directly by said hub, the other of said members having an axially projecting portion provided with grooves for receiving the inwardly and radially extending portions of said frame connected to said hub, thermally responsive means mounted in said frame and adapted to act on a pressure plate, said pressure plate engaging the axially extending portion of said other member, whereby the members are adapted to be urged toward each other to reduce the size of the groove and increase the effective periphery of the pulley upon an increase of temperature, said hub being provided at its end with a centrally located bore, threaded means in said bore for securing said frame to said hub, and interlocking means carried by said hub and said frame cooperating with said threaded means to prevent rotation of the frame on said hub.

WILLIAM W. HALLINAN.